Sept. 26, 1961     E. W. HOUGHTON     3,002,167
ELECTROMAGNETIC WAVE TUNER
Filed May 5, 1958
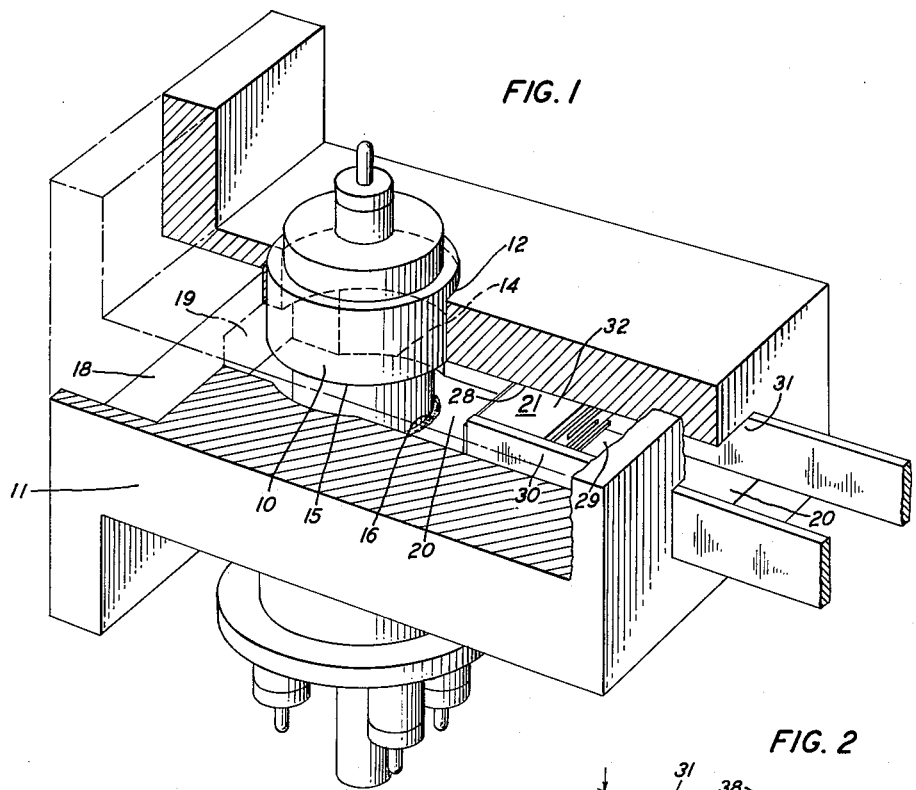
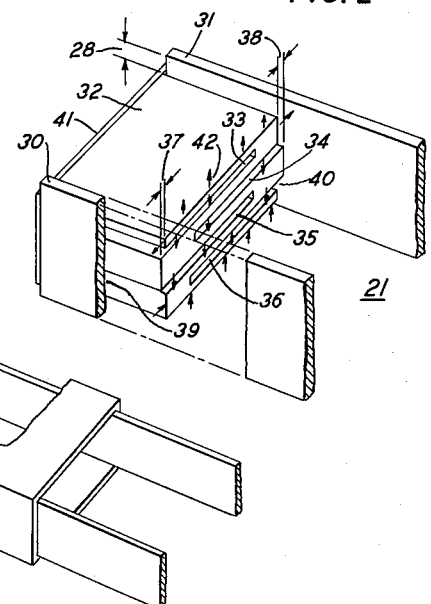
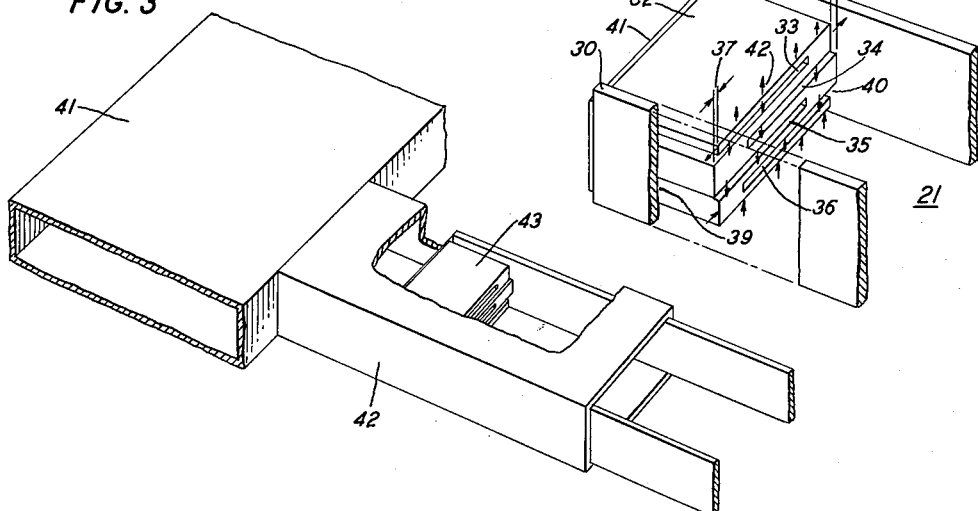
INVENTOR
E. W. HOUGHTON
BY
ATTORNEY

United States Patent Office 3,002,167
Patented Sept. 26, 1961

3,002,167
ELECTROMAGNETIC WAVE TUNER
Edward W. Houghton, Chatham, N.J., assignor to Bell Telephone Laboratories, Incorporated, New York, N.Y., a corporation of New York
Filed May 5, 1958, Ser. No. 733,092
9 Claims. (Cl. 333—83)

This invention relates to high frequency electromagnetic wave devices and, more particularly, to adjustable reactive devices for tuning wave guides, amplifiers, oscillators and the like, and particularly those employing resonant chambers or cavity resonators.

In U.S. Patent 2,410,841 granted November 12, 1946, to A. L. Samuel, it was disclosed that precise or fine adjustment of the tuning of a cavity resonator could be achieved by employing an adjustable branch or auxiliary chamber of such restricted dimensions compared with the main cavity that the resonant frequency of the branch cavity is close to and somewhat above the range of free transmission of electromagnetic waves in the main cavity. The branch cavity is thus beyond cutoff and will not fully support a wave of the frequency to be resonated. Nevertheless, adjustment of the size and shape of the branch cavity will have a definite, but relatively small, effect upon the resonance of the combination as a whole. It has heretofore been the practice to employ as the branch cavity a length of beyond cutoff wave guide suitably coupled at one end to the main cavity and terminated at the other end with a conductive shorting piston of the type that makes metallic wiping contact with the walls of the guide. This arrangement suffers from the obvious defects inherent in all devices that have movable metallic contacts in regions of high electric field or conduction current including undesired losses and variable and unstable effects. Unfortunately, the known types of shorting means employing "traps" to avoid metallic contact are not operative in a cutoff structure.

It is therefore an object of the present invention to eliminate metallic wiping contact in high electric field regions in electromagnetic wave tuning devices.

It is a more specific object to substantially eliminate movable current carrying metallic contacts for terminating a cutoff section of wave guide in an effective short circuit of adjustable position.

In accordance with the present invention, objectionable metallic contacts are avoided by employing a movable quarter wavelength long electromagnetic maze as the terminating member of a beyond cutoff wave guide. The nature of the maze is such that it loads a quarter wavelength long center section of the guide in which it is located sufficiently to support the dominant mode of wave propagation therein. The section of guide between the main cavity and the face of the maze is short enough that fields from the cavity are coupled through it to the maze even though beyond cutoff. The infinite impedance of the cutoff guide section beyond the maze is transformed by the quarter wavelength of the maze into a short circuit at the face of the maze.

These and other objects and features, the nature of the present invention, and its various advantages will appear more fully upon consideration of the accompanying drawings and the following detailed description of these drawings.

FIG. 1 is a cutaway perspective view of a terminating maze in accordance with the invention as it is employed to tune a klystron cavity;

FIG. 2 is an enlarged detail of the terminating maze of FIG. 1; and

FIG. 3 is a perspective view of an alternative use of the invention.

Referring more particularly to FIG. 1 the invention is illustrated in one of its useful applications which is that of tuning the external resonant cavity of a reflex oscillator of the klystron type. The klystron 10 is shown in outline only since its details comprise no part of the present invention. Details of a suitable klystron may, however, be found in an article "Reflex Oscillators" by Pierce and Shepherd, vol. 26, Bell System Technical Journal, page 460 or in the copending application of J. O. Hamilton Serial No. 733,166, filed May 5, 1958, now Patent No. 2,954,498. Klystron 10 is received in accordance with usual practice in a mounting block 11 having suitably machined or cast transversely extending opening 12 therethrough that conforms to the external profile of klystron 10. Resonant cavity 14, also formed within block 11, is basically of right cylindrical shape of diameter which depends upon the fixed parameters of the klystron used and upon the shape of the resonator. These factors are described in detail in chapter 4 of Klystrons and Microwave Triodes, M.I.T. Radiation Laboratory Series, vol. 7. Generally speaking, this diameter is somewhat less than one-half wavelength of the energy to be resonated. Cavity 14 has a top wall 15 and a bottom wall 16 that are at least in part formed by the two grid contacts of klystron 10. The output wave guide 18, having a wide dimension greater than one-half and less the one wavelength of the energy, is coupled through iris 19 in one side of the cylindrical wall of cavity 14. The opposite side of the cylindrical wall is substantially removed to couple cavity 14 to a longitudinally extending wave guide channel 20 formed in block 11. Guide 20 has a wide dimension that is less than one-half wavelength of the resonant frequency in cavity 14, making it substantially equal to or slightly less than the diameter of cavity 14, and a narrow dimension substantially equal to the height of cavity 14.

The combination thus far described is conventional. In operation, the reflex action of klystron 10 sets up an alternating electric field potential between its grids connected to contacts 15 and 16 and therefore between the top and bottom walls of cavity 14 which in turn generates a concentric magnetic field resonant in cavity 14. These fields are coupled through iris 19 and excite the dominant mode of wave propagation in guide 18 to deliver high frequency or microwave power to the connected system. These fields also extend into the end of guide 20. However, the wide dimension of guide 20 is below the one-half wavelength required to support the dominant mode of propagation therein at the fundamental frequency supported in cavity 14. Guide 20 therefore appears to energy within cavity 14 as an inductive susceptance of magnitude which depends upon the effective electrical length of guide 20. This inductive susceptance is coupled into cavity 14, modifies the resonant frequency thereof and hence the oscillatory frequency of klystron 10.

In accordance with the present invention guide 20 is terminated in and its effective length determined by the position of electromagnetic maze 21 shown in enlarged detail in FIG. 2. Maze 21 is such that two folded wave guide channels are formed each having an electrical length of approximately a quarter wavelength at frequency midway in the operating band and a total effective electrical width of greater than one-half wavelength. Each is further capable of being excited in a dominant mode by coupling to a center portion thereof.

The first folded channel 33—37—28—38—34 is disposed so that the top wall of channel 20 forms the top wall of the center portion 28 of the channel. The second folded channel 35—39—29—40—36 is disposed so that the bottom wall of channel 20 forms the bottom wall of the center portion 29 thereof. Numerous ways of assembling such a structure will occur to those skilled in the art. For example, it may be machined or cast from a single block or it may be assembled from multiple, separately machined parts.

In accordance with a preferred embodiment of the invention, maze 21 is assembled from several parts each soldered or otherwise integrally fastened together by suitable means. These parts may be seen more clearly in the enlarged detail of FIG. 2. To simplify the description of these parts and to define their dimensions, all references will be made to the parts as they are shown in the drawing. "Longitudinal" is considered a dimension or direction parallel to the axis of channel 20, "vertical" is considered a transverse dimension or direction parallel to the narrow wall of channel 20, while "horizontal" is considered a transverse dimension or direction parallel to the wide walls of channel 20. Thus, maze 21 includes two flattened and elongated side rails 30 and 31 each of which extend longitudinally one adjacent to each narrow wall of channel 20. Rails 30 and 31 have a vertical dimension that is substantially equal to the narrow dimension of channel 20 and a horizontal dimension that is many times smaller than the vertical dimension. Suitably fastened between rails 30 and 31 is a block 32. Originally block 32 has a rectangular shape with a longitudinal dimension that is a quarter wavelength, a vertical dimension that is slightly less than the wide dimension of channel 20, and a horizontal dimension that is equal to the space between rails 30 and 31. Block 32 is centered upon the vertical dimension of rails 30 and 31 so that equal small spaces 28 and 29 are left between the top and bottom surfaces of block 32 and the top and bottom inside walls of channel 20.

Block 32 is provided with slots 33 through 36 which are cut horizontally, as by sawing, with alternate slots extending in from opposite sides approximately three-quarters of the distance across block 32. The resulting finger between slot 33 and the top surface of block 32 is then shortened to provide a clearance slot 37 between the end of the finger and rail 30. Clearance 37 connects slot 33 to space 28 above block 32. Similar clearances 38, 39 and 40 are provided to connect slot 34 to space 32 and to connect slots 35 and 36 to the space 29 below block 32. Finally, a thin face plate 41 having a horizontal dimension substantially equal to the wide dimension of channel 20 and a vertical dimension equal to the vertical dimension of block 32 is fastened across the face of block 32 and the ends of rails 30 and 31 to cover slots 33 through 36 while leaving open the spaces 28 and 29. The resulting structure is disposed in channel 20 with plate 41 adjacent to cavity 14.

In operation, the magnetic field within cavity 14 tends to bulge out into channel 20 to extend therein parallel to the face of plate 41. This excites a small electric field between the top edge of plate 41 and the top wall of channel 20 and between the bottom wall of channel 20 and the bottom edge of plate 41. These electric fields are transferred respectively to the spaces 28 and 29 where they spread out into the clearances 37 through 40 and into the slots 33 through 36. If the electrical distance from the horizontal center of space 28, around through clearance 37 to the end of slot 33 is at least a quarter wavelength and similarly if the distance from said center through clearance 38 to the end of slot 34 is also at least a quarter wavelength, the electric field will form a full half wave electric field distribution in the folded wave guide channel resulting from the combination of slot 33, clearance 37, space 28, clearance 38 and slot 34. A similar distribution is supported in the bottom slots, clearances and space. Since the longitudinal electrical length of each of these channels is about a quarter wavelength, a standing wave will be set up. Since all clearance spaces are very small and all slots very narrow, these folded channels have very small electric plane dimensions and therefore very low characteristic impedances for the wave energy supported therein. In contrast to this, however, the channel 20 to the right of both folded channels has an infinite impedance at its cutoff frequency and a very high impedance at frequencies on either side of the cutoff. Thus, the quarter wavelength of the folded channels transforms the high impedance difference at their right ends into a very low impedance, amounting in a practical embodiment to substantially a short circuit, at the cross section of plate 41. The position of this short is adjusted by physically adjusting the position of the entire maze structure along channel 20. While rails 30 and 31 make contacts with the surfaces of channel 20, these contacts are in regions of both low electric field and low wall current. The short is thus accomplished without metal wiping contacts in regions of high electric field or of high current.

A feature of the invention resides in the dual function of rails 30 and 31 as they extend into the portion of channel 20 to the right of maze 21. First, they serve as a convenient means for adjusting the position of the maze and for this purpose their extremities may be connected to any suitable mechanical linkage. Second, however, they further reduce the effective magnetic plane dimension of channel 20 and so actually determine the exact cutoff frequency of channel 20 to the right of maze 21. Design considerations in this respect are not critical. If in a particular embodiment, however, it is desired that the cutoff frequency of channel 20, when loaded by rails 30 and 31, fall just above the top operating frequency, rails 30 and 31 should be made as thin as consistent with mechanical requirements (unloaded channel 20 is already beyond cutoff for all frequencies within the band). The effectiveness of rails 30 and 31 in determining the cutoff of the loaded channel however is such that the invention is useful in terminating a wave guide in a short circuit even though the terminated guide is above cutoff and capable of supporting the dominant mode of wave propagation therein. In this use the invention provides a structure that is alternative in its application with the trap type shorting means of the prior art. Either in a cutoff or an above cutoff structure, rails 30 and 31 need only make good electrical contact with the narrow walls of channel 20 at several points along their lengths; a condition that is easy to meet in practice.

While the principles of the invention have thus far been illustrated as applied to tuning a resonant cavity employed in combination with a klystron, they are by no means limited to this application. In FIG. 3 a nonresonant section 41 of rectangular dominant mode wave guide is shown into which it is desired to introduce an inductive susceptance for some purpose not of concern here. This reactance is introduced in accordance with the invention by employing a section of guide 42 connected by an E-plane junction to guide 41. Guide 42 has a wide dimension sufficiently smaller than the wide dimension of guide 41 so that the former is cut off at the frequency of the energy supported by the latter. Disposed in guide 42 is maze 43 which may be identical to the one shown in FIG. 2. Adjustment of the longitudinal positon of maze 43 will determine the amount of inductive susceptance introduced by cutoff guide 42 to wave energy propagating in guide 41.

It is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

What is claimed is:

1. Means for introducing a controlled reactance into a microwave structure comprising, an elongated conductively bounded channel having dimensions too small to support the dominant mode of wave propagation therein coupled to said structure, and movable means disposed in said channel for loading a one-quarter wave length long center portion of said channel sufficiently to support the dominant mode of wave propagation in said center portion.

2. Apparatus for introducing a controlled reactance to microwave energy within a structure comprising a first elongated conductively bounded channel coupled to said structure, said channel having a transverse dimension parallel to the magnetic field of said energy that is less than one-half wavelength of said energy, and a second conductively bounded wave guide channel having a total dimension parallel to said magnetic field that is greater than said one-half wavelength and that is folded up upon itself to be received within said first channel, said second channel having a length axial of said first channel of approximately an odd number of one-quarter wavelengths of said energy and being disposed within a longitudinal center portion of said first channel having a length substantially greater than said odd number of one-quarter wavelengths.

3. The apparatus of claim 2 wherein a portion of the conductive boundary of said second channel is common with a portion of the conductive boundary of said first channel.

4. The apparatus of claim 3 including a transversely extending conductive means closing a portion of one end of said second channel and leaving open the portion of said end having said common boundary with said first channel.

5. The apparatus of claim 2 including a third channel folded upon itself and disposed within said first channel coextensively with said second channel.

6. The apparatus according to claim 2 wherein said first channel is of rectangular transverse cross section having a wide wall and wherein said second channel is formed by space between said wide wall and a conductive body disposed within said first channel and by slots in said conductive body that connect with said space.

7. Means for terminating a conductively bounded rectangular wave guide in a short circuit for electromagnetic wave energy therein, said means comprising a pair of conductive members each extending contiguous and parallel to one of the narrow walls of said guide and having a combined thickness that reduces the wide dimension of said guide below cutoff for said wave energy, a conductive body disposed within said guide between said members with a space between said body and a wide wall of said guide, said body having slots therein that connect with the transverse extremities of said space to form together with said space a wave guiding channel that is one-quarter wavelength long parallel to the axis of said guide and of total transverse dimension to be above cutoff for said energy.

8. Tuning means for a cavity resonator comprising a longitudinally extending conductively bounded rectangular wave guide over a quarter wavelength long and having a wide transverse dimension that is less than one-half wavelength of the energy resonant in said cavity coupled to said cavity, and a conductive body partially filling said guide so that spaces remain between said body and the wide walls of said guide which spaces connect in turn with further spaces within said body, the transverse dimensions of said spaces when laid end to end totaling an extent greater than one-half wavelength of said energy, the longitudinal dimensions of said spaces being coextensive and equal to one-quarter wavelength of said energy.

9. Apparatus for introducing a controlled reactance into a microwave structure comprising, an elongated conductively bounded channel over one-quarter wavelength long and having dimensions too small to support the dominant mode of wave propagation therein coupled to said structure, and means disposed in said channel for loading a one-quarter wavelength long portion thereof sufficiently to support the dominant mode of wave propagation.

References Cited in the file of this patent
UNITED STATES PATENTS

| | | |
|---|---|---|
| 2,567,748 | White | Sept. 11, 1951 |
| 2,770,781 | Dain et al. | Nov. 13, 1956 |
| 2,840,788 | Mullet et al. | June 24, 1958 |